United States Patent [19]

Avgoustis et al.

[11] Patent Number: 4,952,110
[45] Date of Patent: Aug. 28, 1990

[54] ANTI-CROSS THREAD SCREW

[75] Inventors: Gus G. Avgoustis, Westland; Louis Vasilevski, Sterling Heights; Ronald G. Weiss, Taylor; Allan J. Theisen, Grosse Ile, all of Mich.

[73] Assignee: Ring Screw Works, Inc., Madison Heights, Mich.

[21] Appl. No.: 421,513

[22] Filed: Oct. 13, 1989

[51] Int. Cl.⁵ .............................................. F16B 25/00
[52] U.S. Cl. ..................................... 411/386; 411/417; 411/426
[58] Field of Search ............... 411/386, 387, 417, 418, 411/411, 426

[56] References Cited

U.S. PATENT DOCUMENTS

| | | |
|---|---|---|
| 328,139 | 10/1885 | Patten . |
| 986,432 | 3/1911 | Bray . |
| 1,827,615 | 10/1931 | Rosenberg . |
| 2,113,600 | 4/1938 | Olson . |
| 2,122,915 | 7/1938 | Olson . |
| 2,167,910 | 8/1939 | Rottenburg . |
| 2,350,346 | 6/1944 | Gaskell . |
| 2,382,019 | 8/1945 | Miller . |
| 2,387,009 | 10/1945 | Clarkson ............................. 238/349 |
| 2,703,419 | 3/1955 | Barth ................................... 10/152 |
| 2,804,796 | 9/1957 | Devine . |
| 2,836,095 | 5/1958 | Devine . |
| 3,094,894 | 6/1963 | Broberg . |
| 3,156,152 | 11/1964 | Reed . |
| 3,246,556 | 4/1966 | Phipard, Jr. . |
| 3,438,299 | 4/1969 | Gutshall . |
| 3,452,375 | 7/1969 | Gabbey ................................ 10/10 |
| 3,681,963 | 8/1972 | Muenchinger ..................... 72/88 |
| 3,724,315 | 4/1973 | Sygnator ............................. 411/417 |
| 3,882,756 | 5/1975 | Sauer et al. . |
| 3,942,406 | 3/1976 | Egner . |
| 3,965,793 | 6/1976 | Roser . |
| 3,978,760 | 9/1976 | Muenchinger . |
| 4,042,342 | 8/1977 | Muenchinger ..................... 428/585 |
| 4,069,730 | 1/1978 | Gutshall . |
| 4,193,434 | 3/1980 | Wagner . |
| 4,238,165 | 12/1980 | Wagner ............................. 403/408.1 |
| 4,283,986 | 8/1981 | Peterson et al. .................... 411/340 |
| 4,293,257 | 10/1981 | Peterson ................................ 411/11 |
| 4,376,606 | 3/1983 | Peterson ............................. 411/155 |
| 4,377,359 | 3/1983 | Peterson ............................. 411/112 |
| 4,402,640 | 9/1983 | Peterson ............................. 411/112 |
| 4,448,565 | 5/1984 | Peterson ............................. 403/408.1 |
| 4,452,556 | 6/1984 | Nelson et al. ...................... 411/377 |
| 4,477,307 | 10/1984 | Cearlock et al. ................... 156/580 |
| 4,486,135 | 12/1984 | Kazino ................................ 411/387 |
| 4,523,883 | 6/1985 | Peterson et al. .................... 411/171 |
| 4,534,690 | 8/1985 | Barth .................................. 411/386 |
| 4,551,189 | 11/1985 | Peterson ............................ 156/73.5 |
| 4,557,651 | 12/1985 | Peterson ............................. 411/181 |
| 4,564,986 | 10/1986 | Peterson .............................. 29/33 K |
| 4,581,871 | 4/1986 | Blucher et al. ....................... 52/681 |
| 4,630,985 | 12/1986 | Simons ............................... 411/386 |
| 4,652,971 | 3/1987 | Peterson et al. .................... 361/386 |
| 4,676,707 | 6/1987 | Cearlock et al. ................... 411/510 |
| 4,720,075 | 1/1988 | Peterson et al. .................... 248/635 |
| 4,729,706 | 3/1988 | Peterson et al. .................... 411/175 |
| 4,749,322 | 6/1988 | Sygnator ............................. 411/387 |
| 4,789,288 | 12/1988 | Peterson ............................. 411/386 |

FOREIGN PATENT DOCUMENTS

| | | | |
|---|---|---|---|
| 120691 | 12/1945 | Australia . | |
| 448628 | 5/1948 | Canada . | |
| 292734 | 11/1988 | European Pat. Off. ............ | 411/386 |
| 1365015 | 5/1964 | France . | |
| 170244 | 10/1921 | United Kingdom . | |

*Primary Examiner*—Neill R. Wilson
*Attorney, Agent, or Firm*—Harness, Dickey & Pierce

[57] ABSTRACT

A threaded fastener has an eccentric tip with a smooth portion and a threaded portion. The smooth portion when viewed in side elevation defines an edge on a curve with an arcuate slope and the tip threaded portion is coincident with the shank to provide a threaded fastener which substantially eliminates axial and angular misalignment.

10 Claims, 1 Drawing Sheet

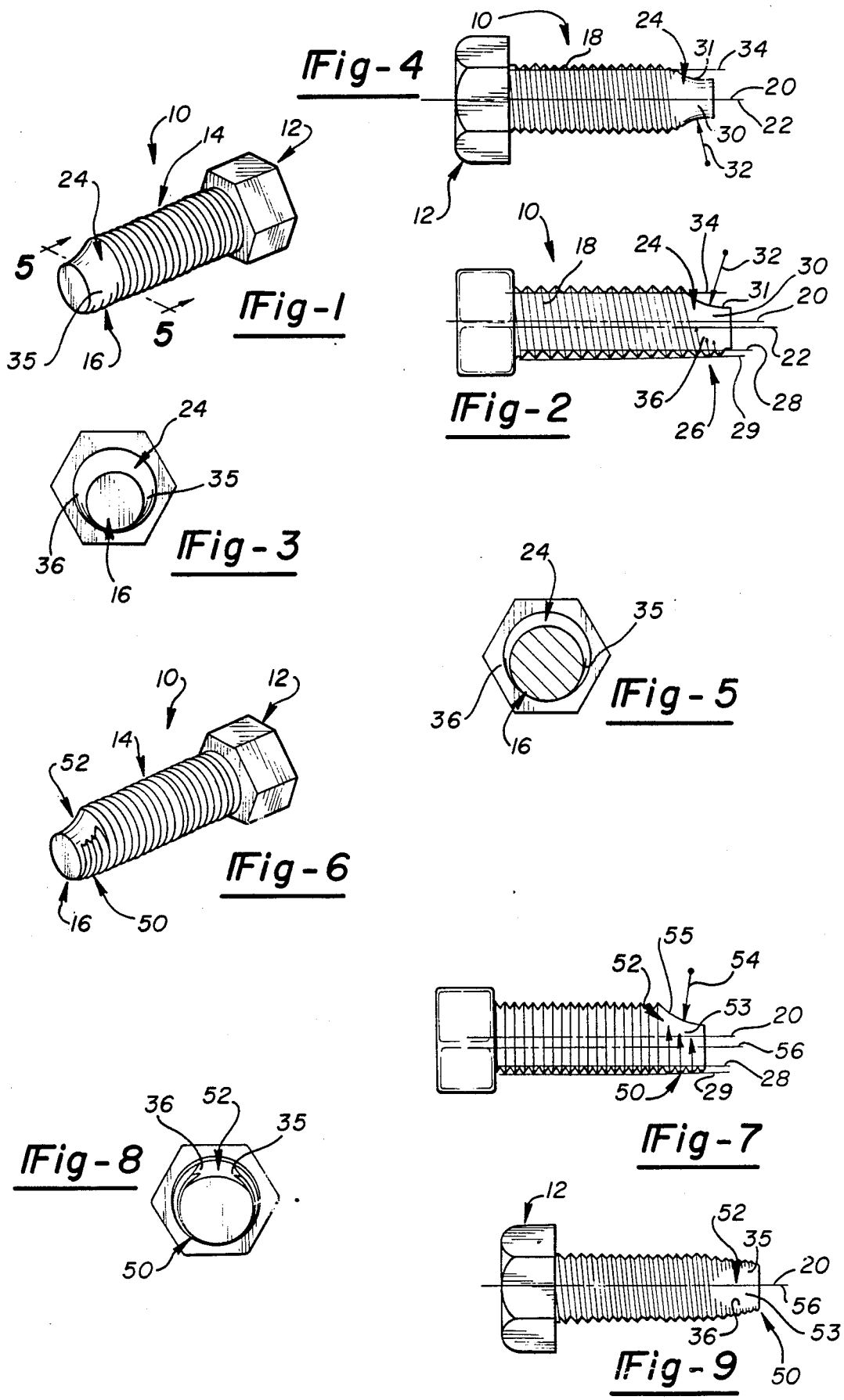

ANTI-CROSS THREAD SCREW

BACKGROUND AND SUMMARY OF THE INVENTION

The present invention relates to threaded fasteners and, more particularly, to anti-cross threaded screws or fasteners.

In the threaded fastener field a common problem which exists is cross-threading. Cross-threading generally occurs when the threaded fastener is received into a threaded nut or hole wherein the threads are in misalignment. Typical misalignments are axial and angular misalignments. In an axial misalignment, the axis of the shank of the screw is parallel with but not colinear with the axis of the receiving nut or hole. In an angular misalignment, the axis of the shank of the bolt is at an angle with respect to the axis of the nut or threaded hole. These misalignments cause the fastener to be cross-threaded and generally leads to seizing of the fasteners. The seizing causes a detrimental effect to both the bolt and nut, generally ruining one or the other or both and causing little or no clamp load in the joint.

Accordingly, it is desirous to have an anti-cross threading bolt or screw which compensates to prevent or correct both axial and angular misalignment. Relevant art generally overcomes the misalignment dilemma by providing an eccentric tip on a threaded bolt or the like. The tip may be threaded or nonthreaded depending upon the particular fastener.

It is an object of the present invention to provide a threaded fastener such as a bolt, screw or the like, which provides anti-cross threading for both axial and angular misalignments. The present invention provides a bolt which is relatively easy, practical and inexpensive to manufacture.

From the following detailed description of the present invention taken in conjunction with the accompanying drawings and claims, other objects and advantages of the present invention will become apparent to those skilled in the art.

BRIEF DESCRIPTION OF THE DRAWINGS

FIG. 1 is a perspective view of a threaded bolt fastener in accordance with the present invention.

FIG. 2 is a side elevation view of the fastener of FIG. 1.

FIG. 3 is an end elevation view of the fastener of FIG. 1.

FIG. 4 is a top elevation view of the fastener of FIG. 1.

FIG. 5 is a vertical cross-section view of FIG. 1 taken through the plane designated by the line 5—5 thereof.

FIG. 6 is a perspective view of another embodiment of the present invention.

FIG. 7 is a side elevation view of the bolt of FIG. 6.

FIG. 8 is an end elevation view of the fastener of FIG. 6.

FIG. 9 is a top elevation view of the fastener of FIG. 6.

DETAILED DESCRIPTION OF THE PREFERRED EMBODIMENT

Turning to the figures, particularly FIG. 1, a threaded fastener bolt is illustrated and designated with the reference numeral 10. The threaded bolt 10 includes a head 12, a threaded shank 14 projecting from the head 12 and a tip 16 at the end of the shank 14 opposing the head 12.

The head 12 may be adapted to be engaged by a tool for applying rotational torque. The head may be slotted to receive a flat or Phillips head screwdriver or may be formed as shown with a hex head to provide flat areas for receiving a wrench or a variety of other drive configurations.

The shank 14 includes a threaded peripheral surface 18 and predetermined major and minor thread diameters. The peripheral surface 18 is continuous about the shank 14 defining an arc circle of 360°. Generally, the shank 14 has a substantially circular cross-section and a longitudinal axis 20.

The tip 16 projects from the shank 18 and defines an axis 22 which is eccentric and generally parallel with the axis 20 of the shank. The tip 16 includes a non-threaded relatively smooth portion 24 and a partially threaded portion 26. The partially threaded portion 26 has a peripheral surface which is on an arc substantially coincident and continuous with the peripheral arc of the shank surface 18. The portion 26 is continuous with and on a longitudinal line 28 when viewed in a side elevation view, as shown in FIG. 2. Generally, the portion 26 has one or more threads opposing the smooth portion 24 and substantially aligned on a longitudinal line 29 which defines an edge of the major thread diameter when viewed in a side elevation view, as shown in FIG. 2.

The tip portion 24 has an arcuate peripheral surface 30. The edge 31 of the surface 30 defines a curve with respect to the longitudinal axes having an arcuate slope of a predetermined radius 32 when viewed in a side or top elevation direction, as seen in FIGS. 2 and 4. The slope of the edge 31 is concave with respect to the line 34. The radius 32 is at a ratio with respect to the major thread diameter at from about 4.5:1 to about 0.5:1 and more preferably from about 2:1 to about 1.2:1.

The ends 35 and 36 of the surface 30 continuously blend into the threaded portion of the shank 14. The tip 16, in cross-section, has a noncircular cross-section, as seen in FIG. 5. The section 24 covers approximately from about 40% to about 80%, preferably from about 50% to about 70% of the periphery of the tip 16.

Referring to FIGS. 6 through 9, another embodiment of the present invention is illustrated. The elements relating to the same elements as previously described will be indicated with the same reference numerals.

The threaded fastener bolt 10 includes a head 12, shank 14 and tip 16. The head 12 and shank 14 are substantially similar to that previously discussed. The tip 16 includes a first threaded portion 50 and a second smooth portion 52. The threaded portion 50 has a peripheral surface on an arc substantially coincident and continuous with the periphery of the arc of the shank 14. The threaded portion 50 surrounds from about 40% to about 85% of the peripheral surface of the tip 16. The portion 50 is continuous with and on a longitudinal line 28 which defines one edge of the minor thread diameter when viewed in a side elevation view, as shown in FIG. 7. Generally, the portion 50 has one or more threads opposing the smooth portion 52 and aligned on a line 29 which defines one edge of the major thread diameter when viewed in a side or top elevation view as shown in FIGS. 7 and 9.

The smooth surface portion 52 has a surface 53 with an arcuate edge 55 which defines a curve with respect to the longitudinal axis having an arcuate slope when viewed in a side elevation direction, as seen in FIG. 7.

The smooth surface portion 52 has an overall paraboloid shape when viewed in a top elevation direction, as seen in FIG. 9. The edge 55 is concave and has a predetermined radius 54 like that previously described herein.

The tip 16 defines an axis 56 which is generally parallel and eccentric or offset with respect to the axis 20 of the shank 14. The cross-section of the tip 16 transverse to the axis 20 is noncircular, as illustrated in FIG. 8.

The threaded portion 50 has ends 35 and 36 which may blend into the smooth portion 52. The smooth portion 52 covers from about 15% to about 60% of the periphery of the tip 16 of the bolt 10.

While the above detailed description describes the preferred embodiment of the present invention, it should be understood that the present invention is susceptible to modification, variation and alteration without deviating from the scope and fair meaning of the subjoined claims.

What is claimed is:

1. A fastener comprising:
   a head; and
   a threaded shank projecting from said head, said shank having a desired radius, an arcuate peripheral surface, a substantially circular axial cross-section and a tip at its axial end opposite said head, said tip comprised of a first portion having a surface with one or more partial threads, the periphery of the one or more partial threads is on an arc substantially coincident and continuous with the peripheral arcuate surface of full threads on said shank such that a radius of said arc is substantially the same as said shank radius, and a second portion having a smooth peripheral surface with its edge defining a curve with respect to the longitudinal axis, the edge having an arcuate slope of a predetermined radius when viewed in a side elevation direction with respect to said shank, said first portion and second portion being continuous with one another having a non-circular axial cross-section, and said tip including an axis being offset with respect to said shank axis.

2. The fastener according to claim 1 wherein said second smooth surface blends into said first surface at its ends.

3. The fastener according to claim 1 wherein said predetermined radius is at a ratio from about 4.5:1 to about 0.5:1 with respect to the major thread diameter.

4. A fastener comprising:
   a head; and
   a threaded shank projecting from said head, said shank having a desired radius and a tip at its axial end opposite said head, said tip comprising a first portion having a surface longitudinally continuous with said threaded shank, said first portion surface being on an arc with a radius substantially equal to the desired radius of the threaded shank, and a second portion having an arcuate surface departing longitudinally from said shank such that the edge of said surface defines a curve from said shank to the end of said tip when viewed in a side elevation along the shank longitudinal axis, said curve having a slope of a predetermined radius, said first portion and second portion being continuous with one another having a non-circular axial cross-section and said tip having a longitudinal axis offset with respect to the shank axis.

5. The fastener according to claim 4 wherein said second surface blends into said first surface at its ends.

6. The fastener according to claim 4 further comprising one or more partial threads on said first tip portion.

7. The fastener according to claim 1 wherein said second portion covers about 40% to about 80% of the surface of the periphery.

8. A fastener comprising:
   a head; and
   a threaded shank projecting from said head, said shank having a desired radius and a substantial circular cross-section and a tip at its axial end opposite said head, said tip comprised of a first portion having a peripheral surface with an edge defining a line, when viewed in said elevation along the longitudinal axis of the shank, said edge surface being substantially coincident and continuous with the peripheral edge surface of said shank such that a radius of an arc of said edge is substantially the same as said shank radius and a second portion having a peripheral surface with an edge defining a curve when viewed in side elevation along the axis of the shank, said second portion curve having an arcuate slope in a longitudinal direction of a predetermined radius, said tip including an axis offset with respect to said shank axis, and said first portion and second portion being continuous with one another, and said tip having a non-circular cross-section.

9. The fastener according to claim 8 wherein said second surface blends into said first surface at its ends.

10. The fastener according to claim 8 wherein said arcuate slope is concave.

* * * * *

UNITED STATES PATENT AND TRADEMARK OFFICE
CERTIFICATE OF CORRECTION

PATENT NO. : 4,952,110

DATED : August 28, 1990

INVENTOR(S) : Gus G. Avgoustis et al

It is certified that error appears in the above-identified patent and that said Letters Patent is hereby corrected as shown below:

On the title page under "U.S. PATENT DOCUMENTS", U.S. Patent "4,564,986 10/1986"; should be --4,564,986 1/1986--.

Under Assignee item [75]: should include --Ford Motor Company, Dearborn Michigan--.

Column 4, line 32, Claim 8: "said" should be --side--.

Signed and Sealed this

Twenty-second Day of September, 1992

Attest:

DOUGLAS B. COMER

Attesting Officer

Acting Commissioner of Patents and Trademarks